United States Patent Office 2,783,356
Patented Feb. 26, 1957

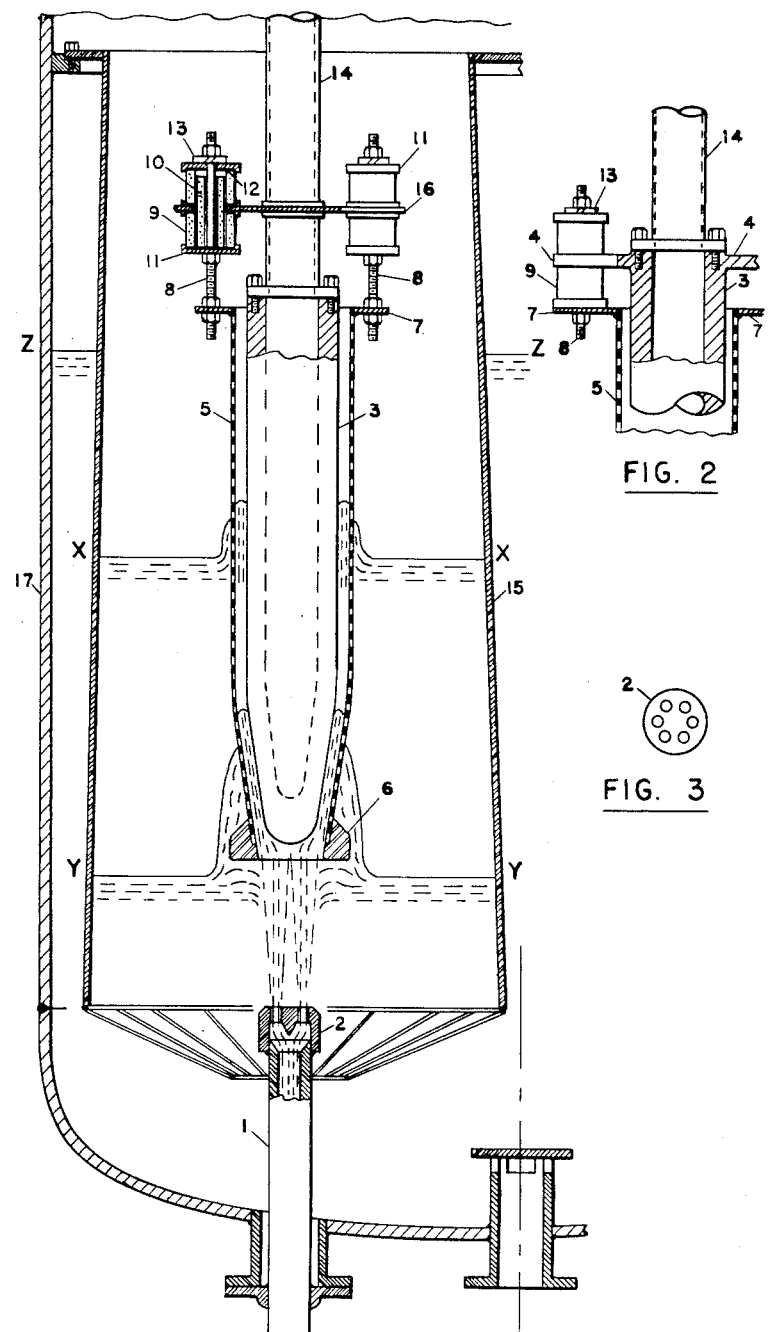

2,783,356

GRID SHIELDED ELECTRODE FOR ELECTRIC BOILERS

Milton Eaton, Shawinigan Falls, Quebec, Canada, assignor to The Shawinigan Water and Power Company, Montreal, Quebec, Canada, a corporation of Quebec Application February 16, 1956, Serial No. 566,009

10 Claims. (Cl. 219—40)

This invention relates to improvements in electrodes for electric steam generators of the type having their electrodes normally partially submerged in the boiler water.

U. S. Patent 2,611,852 describes an improvement in electric steam generators of the imperforate electrode type whereby water is taken from the boiler and is pumped back through water spouts located directly under and pointing upwards toward the tips of the electrodes; preferably the feed water supply is also directed into the water spouts. The spouted water passes along the outside surface of the imperforate electrodes and out into the boiler water. This process is defined as water-spout action and boilers using it are known as water-spout boilers. The essential apparatus required for water-spout action, as originally developed, is shown in Figure 1 of U. S. Patent 2,611,852.

A principal advantage of water-spout action is that the spouted water prevents steam accumulation on the submerged surfaces of the electrodes. If an envelope of steam is allowed to enclose the submerged part of an electrode the electric current must pass through the steam. This results in a voltage gradient such that arcing occurs on the electrode causing rapid corrosion of the metal. The electrode tip is the most vulnerable part of the electrode because it carries current through the full range of boiler load and at the maximum electrode current density.

It has been found in practice that when water is spouted up around the outside of electrodes, as indicated in Fig. 1 of the foregoing patent, oscillations of the boiler water occur, thus causing unstable operation. It became evident that for satisfactory operation the spouted water must be guided beyond the tips of the electrodes. This was first accomplished by the use of hollow electrodes having central holes in their tips and vertical slots arranged around their sides. The spouted water was directed into the electrodes, through the holes in their tips, and out through their lateral slots. This development is described by U. S. Patent 2,676,240.

Although slotted electrodes, as described above, have been in satisfactory operation for a number of years they have the following disadvantages: (1) The smallest practical size has an outside diameter of about 5 inches. (2) The most vulnerable part of the electrode, the tip, receives the least protection from the water-spout action.

Principal objects of the present invention are (1) to provide an improved electrode for use in water-spout electric steam generators, briefly referred to as electric boilers and (2) to provide means for improving the performance of any electric boiler having its electrodes normally partially submerged in the boiler water.

The foregoing objects are achieved by the invention which comprises, in an electric steam generator of the type having at least one electrode normally partially submerged in the boiler water, the improvement which comprises a separate metal grid surrounding each electrode and spaced apart therefrom, each metal grid forming an annular space around its associated electrode and extending at least as low as the bottom of the electrode, and insulated means, located above the highest operating water level on the electrodes, to support each grid so that there is no metallic connection between the grids and any other part of the steam generator.

The invention can be ascertained from the following detailed description of preferred embodiments of it, reference being made to the accompanying drawings in which:

Figure 1 is a sectional view of part of a water-spout boiler with an electrode of this invention in place.

Figure 2 shows an alternate assembly of parts of the electrode.

Figure 3 is a plan view of a suitable water-spout nozzle particularly suitable for use with the electrode.

A sectional view of a typical embodiment of the invention is shown in Fig. 1. It consists essentially of a conventional electrode 3 surrounded by a metal grid 5 having electrically insulated supports 8 and providing an annular space between the electrode and grid. The electrode is preferably of imperforate cylindrical form and tapered to a solid tip, as shown. However electrodes of other construction, such as hollow electrodes having terminal openings and slotted sides, as mentioned above, can also be used. The grid preferably extends below the bottom of the electrode and above the highest operating water level on the electrode, and is preferably provided with a metal ring 6, of greater thickness than the metal of the grid, at its lower end. Boiler electrodes are usually made of cast iron. Perforated plate or wire mesh of corrosion-resistant metal, such as stainless steel, are examples of suitable materials for the grid. Ring 6 should be made of the same metal as grid 5.

A convenient means for providing insulated supports for grid 5 is shown in Fig. 1. Grid 5 is suspended from flange 16 on the electrode terminal connection 14 by supports 8 which are insulated from flange 16 by insulating bushings 9 and 10. Included in the supports are metal caps 11, gaskets, 12, spring washers 13, and grid-supporting flange 7. The gaskets serve to reduce mechanical shock on the insulators 9, and spring washers 13 compensate for unequal temperature coefficients of expansion.

Alternatively the grid 5 can be supported from the electrode 3 by supporting means including flange 4, Fig. 2.

The electrode of this invention will hereinafter be referred to as a grid-shielded electrode.

Figure 1 shows the assembly of a grid-shielded electrode in a water-spout boiler. Water is discharged from water spout 1 through the holes in a suitable nozzle 2, a plan view of which is shown in Fig. 3. The streams of water make contact with the tip of the electrode and rise in the annular space between grid and electrode passing out through the grid into the boiler water. The rate of flow is adjusted so that, at whatever water level the boiler operates, the spouted water rises between the grid and electrode to a higher level. Water level XX indicates operating conditions when the water level in the boiler is above the electrode tips. Operating conditions when the boiler water level falls below the tips of the electrodes are indicated at level YY. Part 15 is a ground shell dividing the section of boiler 17, as shown, into a steam-generating compartment (inside the ground shell) and a control compartment (outside the ground shell).

The length of the grids is made such that the grid supports are above the controlled water level ZZ in the control compartment, which is the highest operating water level on the electrodes.

When the boiler water level falls below an electrode, as indicated by level YY, Fig. 1, the grid functions to hold a substantial body of water in contact with the electrode, thereby creating a voltage gradient such that the possibility of a flashover is eliminated. This feature is of particular importance for boilers designed to operate at high voltages.

Ring 6 functions to reduce the contact resistance and current density at the lower end of the grid thereby preventing corrosion which would otherwise occur.

When the electrode is tapered, as shown in Fig. 1, the electrical resistance of the water between electrode and grid, per unit of depth, decreases towards the higher water levels. As pointed out above, the water-spout action causes the water between the electrode and grid to rise higher than the boiler water level.

For these reasons electric current passing through the boiler water at any level tends to be carried by the grid to a higher level on the electrode. It follows that the use of grid-shielded electrodes makes it practicable to design electrode boilers for higher average current densities on the electrodes thus decreasing the physical dimensions of the boiler and increasing the range of application for high voltage boilers. Other advantages pertaining to the use of grid-shielded electrodes in water-spout boilers are as follows:

1. The spouted water is guided sufficiently to prevent boiler water oscillations by means which impose no limitation on the size of the electrodes.

2. The spouted water passes over the outside of the electrode tips, thus providing the maximum protection from arcing where it is most needed.

3. The possibility of a flashover occurring, as the boiler water level falls below the electrode tips, is eliminated.

If grid-shielded electrodes are used in electrode boilers which are not provided with water-spout action, the following advantages are still obtained:

1. The boilers may be designed for greater average current densities on the electrodes.

2. The tendency to arcing on the surface of the electrodes may be reduced by connecting condensers or capacitors between the grids and their associated electrodes.

These and other advantages of the apparatus disclosed will be apparent to those skilled in the art.

It will also be understood that various modifications may be made in the specific embodiments disclosed without departing from the spirit of the invention or the scope of the following claims.

What is claimed is:

1. In an electric steam generator of the type having at least one electrode normally partially submerged in the boiler water, the improvement which comprises a separate metal grid surrounding each electrode and spaced apart therefrom, each metal grid forming an annular space around its associated electrode and extending at least as low as the bottom of the electrode, and insulated means, located above the highest operating water level on the electrodes, to support each grid so that there is no metallic connection between the grids and any other parts of the steam generator.

2. The improvement in an electric steam generator, as claimed in claim 1, in which the insulated means to support each grid is suspended from the terminal connection of its associated electrode.

3. The improvement in an electric steam generator, as claimed in claim 2, wherein each grid extends below the tip of its associated electrode.

4. The improvement in an electric steam generator, as claimed in claim 3, including a metal ring, of greater thickness than the metal of the grid, at the lower end of the grid to reduce the current density thereat.

5. The improvement in an electric steam generator, as claimed in claim 4, including a capacitor electrically connected between each grid and its associated electrode.

6. The improvement in an electric steam generator, as claimed in claim 5, in which the surfaces of the electrodes are imperforate.

7. An apparatus for improving the performance of an electric steam generator of the type having at least one electrode normally partially submerged in the boiler water, said apparatus comprising a separate metal grid surrounding each electrode and spaced apart therefrom, each metal grid forming an annular space around its associated electrode and extending at least as low as the bottom of the electrode, and insulated means, located above the highest operating water level on the electrodes, to support each grid so that there is no metallic connection between the grids and any other part of the steam generator.

8. An apparatus as claimed in claim 7, in which the insulated means to support each grid is suspended from its associated electrode.

9. An apparatus as claimed in claim 8, in which the metal grid extends below the bottom of the electrode.

10. An apparatus as claimed in claim 9, in which the surfaces of the electrodes are imperforate.

References Cited in the file of this patent

UNITED STATES PATENTS

| | | |
|---|---|---|
| 1,483,280 | Cherry | Feb. 12, 1924 |
| 1,597,362 | Henriksson | Aug. 24, 1926 |
| 2,611,852 | Eaton | Sept. 23, 1952 |
| 2,676,240 | Eaton | Apr. 20, 1954 |